United States Patent
Yeu et al.

(10) Patent No.: US 7,256,229 B2
(45) Date of Patent: Aug. 14, 2007

(54) PAPER COATING LATEX USING IONIC MONOMER

(75) Inventors: Seung-Uk Yeu, Daejeon (KR); Ho-Yeul Choi, Daejeon (KR); Wan-Sik Cha, Kyunggi-do (KR); Seung-Hun Yang, Choongchung-namdo (KR); Chang-Sun Han, Daejeon (KR)

(73) Assignee: LG Chem. Ltd., Seoul (KR)

( * ) Notice: Subject to any disclaimer, the term of this patent is extended or adjusted under 35 U.S.C. 154(b) by 469 days.

(21) Appl. No.: 10/493,202

(22) PCT Filed: Oct. 8, 2002

(86) PCT No.: PCT/KR02/01874

§ 371 (c)(1),
(2), (4) Date: Apr. 21, 2004

(87) PCT Pub. No.: WO03/044273

PCT Pub. Date: May 30, 2003

(65) Prior Publication Data

US 2004/0249055 A1    Dec. 9, 2004

(30) Foreign Application Priority Data

Nov. 20, 2001  (KR) .......................... 2001-0072409

(51) Int. Cl.
*C08K 5/42* (2006.01)
(52) U.S. Cl. ...................................... 524/157; 524/571

(58) Field of Classification Search ................ 524/157, 524/571
See application file for complete search history.

(56) References Cited

U.S. PATENT DOCUMENTS

| 4,130,523 A | 12/1978 | Hoy et al. |
| 6,057,398 A | 5/2000 | Blum |
| 6,414,074 B1 | 7/2002 | Blum |
| 6,767,973 B2 * | 7/2004 | Suau et al. .............. 525/329.7 |

FOREIGN PATENT DOCUMENTS

| JP | 09-169946 A | 6/1997 |
| KR | 1994-0006327 B1 | 7/1994 |
| KR | 1997-0006669 A | 2/1997 |
| KR | 1998-952664 A | 9/1998 |

* cited by examiner

*Primary Examiner*—Peter D. Mulcahy
(74) *Attorney, Agent, or Firm*—Birch, Stewart, Kolasch & Birch, LLP

(57) ABSTRACT

The present invention discloses a paper coating latex containing copolymeric ionic monomer, a paper coating composition containing thereof, and a paper coated with the composition. More specifically, the present invention provides a styrene-butadiene latex for paper coating which contains sodium methallyl sulfonate, an ionic monomer copolymerizing with monomers used in latex manufacturing, as a monomer for emulsion polymerization, and has excellent stability and fluidity, a paper coating composition containing thereof, and a paper coated with the composition.

16 Claims, No Drawings

PAPER COATING LATEX USING IONIC MONOMER

TECHNICAL FIELD

The present invention relates to a paper coating latex containing copolymeric ionic monomer, a paper coating composition containing thereof, and a paper coated with the composition.

More specifically, the present invention provides a styrene-butadiene latex for paper coating which contains an ionic monomer copolymerizing with monomers used in latex manufacturing, as a monomer for emulsion polymerization, and has excellent stability and fluidity, a paper coating composition containing thereof, and a paper coated with the composition.

BACKGROUND ART

In general, a coated paper is manufactured by coating a paper with an inorganic pigment such as clay, calcium carbonate, aluminum hydroxide ($Al(OH)_3$) or titanium dioxide ($TiO_2$), in which a natural binder such as casein or starch, or an artificial binder such as styrene-butadiene latex, polyvinyl alcohol or acryl latex is used with other additives such as a dispersive agent, thickener or insolublizer. In manufacturing the coated paper, the most important component is an inorganic pigment and binder, which must be selected to produce balanced physical properties.

Clay and calcium carbonate are the most frequently used inorganic pigments. Clay of a disk-like structure has an advantage of resulting in a high paper gloss and print gloss, while it has a low fluidity and high binder requirement. Calcium carbonate results in a good fluidity, adhesiveness, ink-acceptance, paper brightness and opacity, while it has a problem that the coating solution requires a high chemical stability against calcium cation.

Recently, in order to improve productivity and to reduce the energy for drying after coating, the concentration of solid components has increased in the coating solution. In this regard, however, the viscosity of the paper coating composition increases and the fluidity of the composition decreases, thereby reducing the operation efficiency.

As the manufacturing of papers speeds up, it is proceeded to increase the coating rate for improving the productivity and managing the increasing demands for printing material. A recent coating rate reaches such a high level as 1,000~1,500 m/min. As a coating rate increases, the shearing stress at coating also increases, therefore, the fluidity of high shear becomes essential to coating. In this place, "high shear" means the shear rate of above several thousands $sec^{-1}$.

The fluidity of low shear affects the transportation of coating solution and coating process, in which "low shear" means in general the shear rate of below several hundreds $sec^{-1}$.

As described above, in order to increase the concentration of coating solution and coating rate, the problem of low-shear/high-shear fluidity of coating solution should be solved previously.

As a measure for the problem, it is disclosed that water-soluble natural binders with high thickening effect, such as starch or casein, have been replaced with artificial binders or the ratio of heavy calcium carbonate of fine particles with a good fluidity has been increased as a pigment. In recent practices, the ratio of calcium carbonate has increased instead of clay. For all the merits of the above method, however, it has some defects that the physical properties of coating surface decrease in paper gloss, print gloss and smoothness, and the chemical and mechanical stability of coating solution lowers.

Further, it is also described that the low-shear/high-shear fluidity increases by using latex of high fluidity. Since the fluidity of coating solution depends actually on latex, this plan is considered to be the most practical and safest solution to improve the fluidity of coating solution. Accordingly, the requirement of latex having excellent fluidity is increasing in the paper manufacturing industry.

In case the particle diameter of latex decreases, the high shear viscosity favorably lowers in general. In this case, however, low shear viscosity disadvantageously increases. Accordingly, desired fluidity cannot be obtained only by adjusting the particle diameter of latex, and it is required to treat properly the surface of latex.

DISCLOSURE OF THE INVENTION

Accordingly, it is an object of the present invention to provide a latex which has high fluidity, excellent high shear fluidity without lowering low shear fluidity, by using an ionic monomer which can copolymerize with monomers consisting of the latex.

In accordance with one aspect of the present invention, it is provided a styrene-butadiene latex for paper coating comprising 0.01~10% by weight of sodium methallyl sulfonate as an ionic monomer which can copolymerize with monomers consisting of the latex.

A problem in increasing the concentration of coating solution and raising the coating rate is to ensure the stability of coating solution. In the typical coating method, the coating solution is transferred to the surface of paper from applicator-roll and the surplus amount is removed by using suitable equipment such as blade or air-knife. In this step, the coating solution is under the high pressure, which makes the mechanical stability of coating solution very important. When the stability of coating solution is broken at high pressure, gumming up of coating solution may happen at the edge of applicator-roll, and streak, fish-eyes, or contamination of blade may appear, thereby resulting in fatal loss. In case the coating solution has high concentration and the coating rate increases, the stability of coating solution becomes essential to and decides on the productivity of coated paper.

The stability of coating solution is usually influenced by latex. The latex used in coating solution is generally carboxylated styrene-butadiene latex, and the stability of coating solution is maintained by emulsifier and the carboxyl group on the surface of latex. Carboxyl group is typically obtained by using ethylene unsaturated carboxylic acid as copolymerization monomer, in which the carboxyl group is fixed on the surface of latex to increase the stability. In this case, however, since pH of a typical coating solution is 8~11, the carboxyl group rarely allows sufficient chemical stability. As an emulsifier, having some differences according to its functional groups, anionic emulsifier having such functional groups as sulfate or sulfonate, or non-ionic emulsifier of ethylene oxides is used to enhance the stability. However, since an emulsifier is adsorbed to latex without being adhered thereto, it is easy to be detached when mechanical shearing stress is applied. Therefore, an emulsifier makes little effect on the stability and may result in severe foaming.

Considering the above, the present inventors revealed that an ionic monomer which is able to copolymerize on the surface of latex can improve greatly the mechanical and chemical stability. That is, a highly soluble ionic monomer is adhering to the surface of latex by way of copolymerization, which prevents the decrease of stability and foaming due to its detaching from the surface, thereby greatly improving the stability.

An important feature of coating solution is water-retention property, which means the property of retaining water against external influences. The property is required to prevent excessive water from infiltrating toward the base paper against the strong blade pressure at coating. In case the coating solution has low water-retention property, the solid portion of coating solution increases on the process of coating, thereby causing problems in operation and resulting in irregular distribution of binders such as binder migration. The water-retention property varies in each latex, and is affected by acid monomer, emulsifier, and monomer composition. An emulsifier, which is able to copolymerize, lowers the surface energy of latex and enhances hydrophilic property, thereby increasing the water-retention property.

A difficult problem on the manufacturing of latex for paper coating relates to scales. Since latex is used as an adhesive, there is a large quantity of scales generated in the reactor or stirrer on its manufacturing process, which becomes worse as the size of latex is smaller. The scales work as impurities in the next process and may cause many problems such as irregularity of physical properties at successive steps. Accordingly, scales are required to be removed, and which needs additional labor and time and makes adverse affects on the productivity increase.

Besides the scales formed in the reactor, fine coagulums remain in suspension. The amount of the coagulums tends to increase as the diameter of latex decreases. The coagulums are removed by screening after the completion of copolymerization and at the time of manufacturing coating solution, which consumes time and labor to make difficulty in managing the products and results in serious problems such as streak on the surface of paper to deteriorate the quality.

As the diameter of latex decreases and the concentration of solid increases, the copolymerization stability of latex is considered to be important. Ensuring the copolymerization stability of latex may improve the quality of latex and increase the productivity. Further, it may greatly decrease the irregularity of physical property in continuous production to improve the quality.

The ionic monomer of the present invention may stabilize the surface of latex during the copolymerization reaction to remedy greatly the problem of coagulum, and especially to effect on maintaining the stability of latex.

The paper coating composition of the present invention comprises pigments, adhesives, and other additives. As an adhesive, synthetic latex such as styrene-butadiene latex is used. The latex greatly affects on the quality of printing paper.

Adhesive strength (dry pick resistance) is an important printing quality. According to the tendency toward high speed printing, the adhesive strength is considered very important requirement in coating solution. That is, the pigment should not be removed from the coating layer against the strong mechanical pressure on the surface of pigment-coated paper at printing process to give fine appearance after the printing.

Physical factors of styrene-butadiene latex related to the adhesive strength of coated paper are glass transition temperature, particle diameter, gel content, monomer composition, etc.

Another important property of coating solution is an ink set off (ink drying speed). In case of multi-color printing, multiple printing by the four (4) colors of blue, black, red and yellow is generally carried out. The higher the printing speed is, the shorter the time interval to the printing of next color, which requires even higher ink set off. If the next step proceeds without sufficient drying of ink, such problems as print mottle or after-staining may occur. The relationship between gel content and ink set off is disclosed from the difference of film formation due to the gel content, and also expressed in the difference of swelling index, which is the amount of solvent contained in latex particle.

Gloss is an important physical factor to enhance the value of printing paper and make goods of high quality. Gloss is classified into paper gloss of coated paper and print gloss after printing, and the paper having higher value of both glosses has elegant appearance.

To heighten the paper gloss, the particle diameter of latex should be enlarged or the content of latex should be decreased in coating solution. In this case, however, the adhesive strength decreases.

To heighten the print gloss, air permeability should be decreased so as to contain solvent in the surface until the stable configuration is achieved after the printing. For the purpose of it, the ink set off is required to be lowered.

An important printing quality in offset printing is water resistance. In offset printing wetting water is used, and therefore, in case water resistance (wet pick resistance) is low, pigments may be removed due to the strong physical pressure in the course of printing.

As to the relationship between water resistance and gel content, similarly to adhesive strength, the maximum water resistance appears on a suitable gel content. Generally, the gel content having the maximum adhesive strength does not coincide with that having the maximum water resistance.

Another printing quality required in offset printing is wet ink receptivity. As described above, wetting water is used in offset printing, and therefore, in case that coated paper does not effectively absorb water in printing, it can not be stained with the ink incompatible with water, thereby decreasing the printing condition. Generally, wet ink receptivity is counter to water resistance, therefore, it is hard to increase both of them.

The latex showing superiority in all the printing qualities is hard to be prepared, and therefore, the conditions for printing and coating are also complicated. In order to be distinguished in all the physical properties, monomer content, gel content, particle diameter, etc. must be controlled more strictly, and therefore, the stability of polymerization often tends to be lowered. Further, the physical properties conflicting with each other are hard to be improved at a time, and the conventional monomer composition has a limit of itself.

The ionic monomer of the present invention exerts an influence on the surface energy of latex to modify its surface property, thereby improving simultaneously ink set off, water resistance, wet ink receptivity, adhesive strength, etc.

Therefore, it is understood that the use of ionic monomers of the present invention allows a latex having a good stability and superior printing quality to be prepared.

That is, the use of ionic monomer which can copolymerize makes it possible to improve fluidity, mechanical stability and polymerization stability. However, all the ionic monomer that can copolymerize does not have such effect, and there appears great difference of physical properties according to the kind of emulsifiers.

The present invention provides a latex and paper coating solution which has improved fluidity and stability by using sodium methallyl sulfonate, an ionic monomer having distinguished physical properties.

Emulsifiers are added to give a stability to latex during and after the polymerization reaction, and a variety of anionic emulsifiers and non-ionic emulsifiers can be used. The anionic emulsifiers may include alkyl benzene sulfonate, alcohol sulfate, alcohol ether sulfonate, alkyl phenol ether sulfonate, alpha-olefin sulfonate, paraffin sulfonate, ester sulfosuccinate, phosphate ester, etc. and examples of the non-ionic emulsifiers are alkyl phenol ethoxylate, fatty amine ethoxylate, fatty acid ethoxylate, alkanoamide, etc.

Sodium methallyl sulfonate, a copolymerizable ionic monomer according to the present invention, afford a stability, which cannot be achieved by the use of emulsifiers, so that it can be mixed with the above-mentioned emulsifiers in a controlled amount. The sodium methallyl sulfonate is used in an amount of 0.01~10% by weight, preferably 0.1~5% by weight. If the amount of sodium methallyl sulfonate is below 0.01% by weight, no effect is produced. While the amount of it is above 10% by weight, each of physical properties such as polymerization stability or printing property may be decreased due to the excessive ionic polymer.

Glass transition temperature of the latex ranges from −10 to 100° C., preferably from −5 to 40° C.

Particle diameter of the latex ranges from 30 to 300 nm, preferably from 100 to 200 nm. If the diameter is less than 30 mm, low shear fluidity increases and paper gloss, ink set off and wet ink receptivity decrease. If the diameter is larger than 300 nm, high shear fluidity increases and print gloss, adhesive strength and water resistance decrease.

Gel content of the latex ranges from 30 to 95%, preferably from 60 to 80%.

As a latex composition, monomer mixture containing 5~55% by weight of 1,3-butadiene, 40~94% by weight of styrene, 1~15% by weight of ethylene unsaturated acid monomers, 0~10% by weight of vinyl cyanide monomers, and 0~30% by weight of other copolymerizable vinyl monomers is employed.

1.3-Butadiene gives flexibility to the copolymer. If the amount of 1,3-butadiene is less than 5% by weight, the copolymer prepared is too hardened. If the amount is above 55% by weight, the water resistance decreases.

Styrene gives suitable hardness and water resistance to the copolymer. If the amount of styrene is less than 40% by weight, no sufficient effect can be produced. If the amount is above 94% by weight, the adhesive strength and film forming ability decrease.

Ethylene unsaturated acid monomers are appropriately used to increase the adhesive strength of copolymer and to improve the stability of latex particle. It is used in an amount of 1~15% by weight, preferably 2~9% by weight. If the amount is less than 1% by weight, the above effect cannot be produced. If the amount is over 15% by weight, it causes some troubles in polymerization stability. Specific examples of the ethylene unsaturated acid monomers are unsaturated carboxylic acids such as methacrylic acid, acrylic acid, itaconic acid, crotonic acid, fumaric acid or maleinic acid, and unsaturated polycarboxylic acid alkyl esters having at least one carboxyl group such as itaconic acid monoethyl ester, fumaric acid monobutyl ester or maleic acid monobutyl ester.

Vinyl cyanide monomers effectively improve print gloss. It is used in an amount of 0~10% by weigh, preferably 3~8% by weight. Specific examples of the vinyl cyanide monomers are acrylonitrile, methacrylonitrile, etc.

In case of synthesizing the copolymer latex used in the present invention, if necessary, such monomers as can copolymerize with the above-mentioned monomers may be employed. Specific examples of the monomers are unsaturated carboxylic acid alkyl esters such as methylacrylate, methylmethacrylate, ethylacrylate, ethylmethacrylate, butylacrylate, butylmethacrylate, etc; unsaturated carboxylic acid hydroxyalkyl esters such as β-hydroxyethyl acrylate, β-hydroxypropyl acrylate or β-hydroxyethyl methacrylate; unsaturated carboxylic acid amides such as acrylamide, methacrylamide, itaconamide or maleic acid monoamide and derivatives thereof; and aromatic vinyl monomers such as α-methyl styrene, vinyl toluene or p-methyl styrene. The unsaturated carboxylic acid alkyl esters give the copolymer appropriate hardness and improve film forming ability. It is used in an amount of 0~30% by weight, preferably 3~15% by weight. The amount of above 30% by weight may produce unfavorable effect on water resistance, etc. The unsaturated carboxylic acid amide and derivatives thereof are effectively improve chemical stability, mechanical stability and water resistance. It is preferably used in an amount of 10% by weight or less.

Molecular weight regulators are used to regulate the molecular weight, gel content and gel structure of copolymer. Specific examples of the molecular weight regulator are n-dodecyl mercaptan, t-dodecyl mercaptan, etc. It is used in an amount of 0~10% by weight, preferably 0.2~2.0% by weight. The amount of less than 0.2% by weight hardly produces the effect, while the amount of more than 10% by weight may exert an undesirable influence on rate and stability of the reaction.

Manufacturing process of latex consists of two or more steps, in which seed latex is typically prepared and then polymerized by coating in 1~3 layers. Polymerization initiators, emulsifiers, electrolytes, etc. and other reaction conditions are the same as in the conventional emulsion polymerization.

BEST MODE FOR CARRYING OUT THE INVENTION

Hereinafter, the present invention will be described in detail, in conjunction with various examples. These examples are provided only for illustrative purposes, and the present invention is not to be construed as being limited to those examples.

In the examples, physical properties of latex, coating solution and coated paper were determined by the following method.

Latex diameter was determined by using Laser Scattering Analyzer (Nicomp).

Low shear viscosity was measured by using BF type viscometer.

Viscosity of coating solution was indicated in the value (unit: cP) measured by using No. 3 rotor at 60 rpm for 1 minute.

High shear viscosity was indicated in the value (unit: cP) measured by using Hercules Viscometer (KRK type, model KC-801C) at 60 rpm for 1 minute.

Stability was measured by sieving the coagulum with #325 mesh which had been produced by stirring the coating solution using Maron Tester for 10 minutes at 70° C. The unit of stability is ppm, and higher value means lower stability.

Gel content was measured by adjusting the polymerized latex to pH 7~8, drying at room temperature for 24 hours, cutting the formed film to a suitable size and putting in 80 mesh-net, dissolving them in an excess of tetrahydrofuran for 14 hours, and indicating the content of insoluble in percentage (%).

Adhesive strength was determined by printing several times with RI printer and estimating the extent of ink to be stripped off by 5-score method. Higher score indicates better adhesive strength. After determining the score using each ink of Taq-Value 12, 14 and 16, mean value was calculated.

Water resistance was determined by adding wetting water using molten roll in RI printer, printing and estimating the extent of ink to be stripped off in the same way as in the adhesive strength. The score was determined after printing once with ink of Taq-Value 14.

Ink set off was determined by printing in RI printer and estimating the extent of ink to be stripped off by 5-score method. Higher score indicates higher ink set off.

Wet ink receptivity was determined by adding wetting water in RI printer, printing and estimating the extent of ink to be transferred. In this method, stripping off was prevented by using the ink of low Taq-Value. Higher score indicates higher wet ink receptivity.

Paper gloss was determined by measuring on several sites of the coated paper using Optical Gloss Meter (HUNTER type, 75°~75°) and calculating the mean value.

Print gloss was determined in the same way as in the paper gloss at 24 hours after printing in RI printer.

EXAMPLE 1

(Step 1)

After replacing the air in a 10 l-pressure reactor, which is installed with stirrer, thermometer, cooler and entrance of nitrogen gas for feeding successively monomer, emulsifier and polymerization initiator, with nitrogen gas, the following components were added into the reactor, which was then heated to 65° C.:

| | |
|---|---|
| Butadiene | 33 parts by weight |
| Styrene | 40 parts by weight |
| Methylmethacrylate | 12 parts by weight |
| Acrylonitrile | 8 parts by weight |
| Itaconic acid | 5 parts by weight |
| Sodium dodecyl dibenzene sulfonate | 4 parts by weight |
| Sodium methallyl sulfonate | 2 parts by weight |
| t-Dodecylmercaptan | 0.15 part by weight |
| Sodium bicarbonate | 0.5 part by weight |
| Ion-exchanged water | 420 parts by weight |

1 part by weight of potassium persulfate, which is an polymerization initiator, was added to the reactor and the mixture was stirred for about 300 minutes to complete the polymerization of seed. The mean particle diameter of the seed obtained was 70 nm, the conversion rate was 98%, and the gel content was 83%.

(Step 2)

To coat the seed obtained in step 1 with the first layer, 15 parts by weight of seed latex was put in the reactor and heated to 75° C. Then, the following components were added successively to the reactor for 150 minutes to polymerize:

| | |
|---|---|
| Butadiene | 34 parts by weight |
| Styrene | 46 parts by weight |
| Methylmethacrylate | 10 parts by weight |
| Acrylonitrile | 4 parts by weight |
| Itaconic acid | 2 parts by weight |
| Acrylic acid | 3 parts by weight |
| Sodium dodecyl dibenzene sulfonate | 1 part by weight |
| Sodium methallyl sulfonate | 1 part by weight |
| t-Dodecylmercaptan | 1.1 parts by weight |
| Sodium bicarbonate | 0.4 part by weight |
| Ion-exchanged water | 66 parts by weight |
| Potassium persulfate | 2.5 parts by weight |

After the addition of the above components, the mixture was stirred for 60 minutes to complete polymerization. The latex with the first layer polymerized as above-mentioned has a mean particle diameter of 135 nm, a conversion rate of 93%, and a gel content of 72%.

(Step 3)

To coat the latex obtained in step 2 with the second layer, the reactor containing 507 parts by weight of the latex was maintained at 75° C. Then, the following components were added successively to the reactor for 60 minutes to polymerize:

| | |
|---|---|
| Butadiene | 42 parts by weight |
| Styrene | 40.3 parts by weight |
| Methylmethacrylate | 5 parts by weight |
| Acrylonitrile | 8 parts by weight |
| Itaconic acid | 2 parts by weight |
| Acrylic acid | 2 parts by weight |
| Sodium dodecyl dibenzene sulfonate | 0.7 part by weight |
| Sodium methallyl sulfonate | 0.7 part by weight |
| t-Dodecylmercaptan | 0.9 parts by weight |
| Sodium bicarbonate | 0.4 part by weight |
| Ion-exchanged water | 79 parts by weight |
| Potassium persulfate | 2.0 parts by weight |

After the addition of the above components, the mixture was stirred for 200 minutes to complete polymerization. The latex with the second layer polymerized as above-mentioned has a mean particle diameter of 170 nm, a conversion rate of 98%, and a gel content of 78%.

Examples 2 and 3 had the same reaction conditions, processes and compositions as in Example 1 except that the amount of sodium dodecyl dibenzene sulfonate and sodium methallyl sulfonate were added as follows.

EXAMPLE 2

| | Sodium dodecyl dibenzene sulfonate | Sodium methallyl sulfonate |
|---|---|---|
| Step 1 | 4 parts by weight | 2 parts by weight |
| Step 2 | 2 parts by weight | 0 |
| Step 3 | 1.4 parts by weight | 0 |

EXAMPLE 3

| | Sodium dodecyl dibenzene sulfonate | Sodium methallyl sulfonate |
|---|---|---|
| Step 1 | 4 parts by weight | 2 parts by weight |
| Step 2 | 0.5 part by weight | 1.5 parts by weight |
| Step 3 | 0.3 part by weight | 1.1 parts by weight |

EXAMPLE 4

Example 4 had the same reaction conditions, processes and compositions as in Example 1 except that the amount of acrylic acid and sodium methallyl sulfonate were added as follows:

|  | Acrylic acid | Sodium methallyl sulfonate |
|---|---|---|
| Step 2 | 0 | 4 parts by weight |
| Step 3 | 0 | 2.7 parts by weight |

EXAMPLE 5

(Step 1)
Same as in Example 1.
(Step 2)
To coat the seed obtained in step 1 with the first layer, 28 parts by weight of seed latex was put in the reactor and heated to 75° C. Then, the following components were added successively to the reactor for 150 minutes to polymerize:

| Butadiene | 40 parts by weight |
|---|---|
| Styrene | 40.5 parts by weight |
| Methylmethacrylate | 6 parts by weight |
| Acrylonitrile | 6 parts by weight |
| Itaconic acid | 3 parts by weight |
| Acrylic acid | 3 parts by weight |
| Sodium dodecyl dibenzene sulfonate | 1.5 parts by weight |
| Sodium methallyl sulfonate | 1.5 parts by weight |
| t-Dodecylmercaptan | 1.4 parts by weight |
| Sodium bicarbonate | 0.4 part by weight |
| Ion-exchanged water | 66 parts by weight |
| Potassium persulfate | 2.5 parts by weight |

After the addition of the above components, the mixture was stirred for 60 minutes to complete polymerization. The latex with the first layer polymerized as above-mentioned has a mean particle diameter of 107 nm, a conversion rate of 90%, and a gel content of 63%.

(Step 3)
To coat the latex obtained in step 2 with the second layer, the reactor containing 507 parts by weight of the latex was maintained at 75° C. Then, the following components were added successively to the reactor for 60 minutes to polymerize:

| Butadiene | 42 parts by weight |
|---|---|
| Styrene | 37 parts by weight |
| Methylmethacrylate | 6 parts by weight |
| Acrylonitrile | 9 parts by weight |
| Itaconic acid | 2 parts by weight |
| Acrylic acid | 3 parts by weight |
| Sodium dodecyl dibenzene sulfonate | 1 part by weight |
| Sodium methallyl sulfonate | 1 part by weight |
| t-Dodecylmercaptan | 1.0 part by weight |
| Sodium bicarbonate | 0.4 part by weight |
| Ion-exchanged water | 79 parts by weight |
| Potassium persulfate | 2.0 parts by weight |

After the addition of the above components, the mixture was stirred for 200 minutes to complete polymerization. The latex with the second layer polymerized as above-mentioned has a mean particle diameter of 125 nm, a conversion rate of 98%, and a gel content of 69%.

EXAMPLE 6

Example 6 had the same reaction conditions, processes and compositions as in Example 5 except that the amount of sodium dodecyl dibenzene sulfonate and sodium methallyl sulfonate were added as follows:

|  | Sodium dodecyl dibenzene sulfonate | Sodium methallyl sulfonate |
|---|---|---|
| Step 1 | 4 parts by weight | 2 parts by weight |
| Step 2 | 0.5 part by weight | 2.5 parts by weight |
| Step 3 | 0.3 part by weight | 1.7 parts by weight |

EXAMPLE 7

Example 7 had the same reaction conditions, processes and compositions as in Example 5 except that the amount of itaconic acid and sodium methallyl sulfonate were added as follows:

|  | Itaconic acid | Sodium methallyl sulfonate |
|---|---|---|
| Step 1 | 2 parts by weight | 5 parts by weight |
| Step 2 | 0 | 4.5 parts by weight |
| Step 3 | 0 | 3 parts by weight |

COMPARATIVE EXAMPLE 1

Comparative Example 1 had the same reaction conditions and processes as in Example 1 except that the amount of emulsifier and ethylene unsaturated acid monomer were added as follows and sodium methallyl sulfonate was not added:

|  | Sodium dodecyl dibenzene sulfonate | Acrylic acid |
|---|---|---|
| Step 1 | 4 parts by weight | 2 parts by weight |
| Step 2 | 2 parts by weight | 3 parts by weight |
| Step 3 | 1.4 parts by weight | 2 parts by weight |

COMPARATIVE EXAMPLE 2

Comparative Example 2 had the same reaction conditions and processes as in Example 5 except that the amount of emulsifier and ethylene unsaturated acid monomer were added as follows and sodium methallyl sulfonate was not added:

|  | Sodium dodecyl dibenzene sulfonate | Itaconic acid |
| --- | --- | --- |
| Step 1 | 4 parts by weight | 7 parts by weight |
| Step 2 | 3 parts by weight | 3 parts by weight |
| Step 3 | 2 parts by weight | 2 parts by weight |

Polymerization stabilities of the latexes obtained from the Examples and Comparative Examples were measured by sieving with #150, #200 and #325 mesh and calculating the amount of impurities on the basis of the solid material by ppm. The results are shown in Table 1.

TABLE 1

|  | 150 mesh | 200 mesh | 325 mesh |
| --- | --- | --- | --- |
| Example 1 | 45 | 28 | 17 |
| Example 2 | 64 | 54 | 77 |
| Example 3 | 21 | 8 | 11 |
| Example 4 | 7 | 2 | 2 |
| Example 5 | 88 | 62 | 59 |
| Example 6 | 38 | 21 | 11 |
| Example 7 | 13 | 5 | 9 |
| Comparative Example 1 | 157 | 88 | 350 |
| Comparative Example 2 | 456 | 281 | 583 |

In order to compare the polymerization stabilities of Examples and Comparative Examples, the impurities formed in the reactor were weighed after the completion of polymerization. The results are shown in Table 2.

TABLE 2

|  | Weight of the scale |
| --- | --- |
| Example 1 | 20 g |
| Example 2 | 75 g |
| Example 3 | 12 g |
| Example 4 | 25 g |
| Example 5 | 104 g |
| Example 6 | 32 g |
| Example 7 | 37 g |
| Comparative Example 1 | 259 g |
| Comparative Example 2 | 413 g |

In order to compare and estimate the latexes obtained from the Examples and Comparative Examples, a paper coating solution was prepared having the following composition:

|  |  |
| --- | --- |
| Clay (1st grade) | 57 parts by weight |
| Calcium carbonate | 43 parts by weight |
| Styrene-butadiene latex | 12 parts by weight |
| Oxidized starch | 1.3 parts by weight |

Distilled water was added to make the solid content to be 67.3% of the total coating solution.

The prepared coating solution was used in the following condition to make a coated paper:

Coating: Rod hand coating (Rod Coating, No. 6)
Drying: Oven, 105° C., 30 seconds
Calendar: Super Calendar, 80° C., 100 kg/cm, 4 m/min, passing 2 times
Base paper: Base paper on the market (weighing 72 gsm)
The results are shown in Tables 3 and 4.

TABLE 3

|  | Low shear viscosity (cp) | High shear viscosity (cp) | Stability (ppm) |
| --- | --- | --- | --- |
| Example 1 | 1580 | 13.5 | 320 |
| Example 2 | 1700 | 14.2 | 540 |
| Example 3 | 1590 | 13.1 | 120 |
| Example 4 | 1510 | 12.1 | 280 |
| Example 5 | 1900 | 10.8 | 480 |
| Example 6 | 1820 | 9.7 | 180 |
| Example 7 | 1760 | 9.1 | 220 |
| Comparative Example 1 | 1820 | 15.1 | 850 |
| Comparative Example 2 | 2050 | 11.4 | 1170 |

TABLE 4

|  | Adhesive strength | Water resistance | Ink set off | Wet ink receptivity | Paper gloss | Print gloss |
| --- | --- | --- | --- | --- | --- | --- |
| Example 1 | 3.8 | 4.1 | 4.2 | 4.2 | 71 | 81 |
| Example 2 | 3.8 | 4.0 | 4.0 | 4.3 | 72 | 82 |
| Example 3 | 3.9 | 4.3 | 4.4 | 4.2 | 71 | 80 |
| Example 4 | 4.0 | 4.3 | 4.4 | 4.1 | 71 | 80 |
| Example 5 | 4.3 | 3.8 | 3.5 | 4.5 | 70 | 85 |
| Example 6 | 4.4 | 3.9 | 3.7 | 4.4 | 70 | 84 |
| Example 7 | 4.4 | 4.0 | 3.8 | 4.4 | 70 | 83 |
| Comparative Example 1 | 3.7 | 3.9 | 3.9 | 4.3 | 71 | 81 |
| Comparative Example 2 | 4.2 | 3.5 | 3.2 | 4.4 | 70 | 85 |

INDUSTRIAL APPLICABILITY

As apparent from the above description, the present invention provides a paper coating latex containing copolymeric ionic monomer, a paper coating composition containing thereof, and a paper coated with the composition. The latex and paper coating solution of the present invention have greatly improved fluidity and stability, and the coated paper of the present invention shows superiority in printing quality.

The invention claimed is:

1. A styrene-butadiene latex for paper coating comprising:
   0.01~10% by weight of sodium methallyl sulfonate as an ionic monomer which copolymerizes with monomers of said latex,
   5~55% by weight of 1,3-butadiene,
   40~94% by weight of styrene,
   1~15% by weight of ethylene unsaturated acid monomers,
   0~10% by weight of vinyl cyanide monomers,
   0~30% by weight of other copolymerizable vinyl monomers, and
   0.2~10% by weight of molecular weight regulator.

2. The styrene-butadiene latex for paper coating of claim 1, wherein the gel content of said latex is 30~95%.

3. The styrene-butadiene latex for paper coating of claim 1, wherein said ethylene unsaturated acid monomers are unsaturated carboxylic acids, or unsaturated polycarboxylic acid alkyl esters having at least one carboxyl group.

4. The styrene-butadiene latex for paper coating of claim 1, wherein said vinyl cyanide monomers are acrylonitrile or methacrylonitrile.

5. The styrene-butadiene latex for paper coating of claim 1, wherein said other copolymerizable vinyl monomers are unsaturated carboxylic acid alkyl esters; unsaturated carboxylic acid hydroxyalkyl esters; unsaturated carboxylic acid amides; or aromatic vinyl monomers.

6. The styrene-butadiene latex for paper coating of claim 1, wherein said molecular weight regulator are n-dodecyl mercaptan or t-dodecyl mercaptan.

7. A paper coating composition containing the styrene-butadiene latex for paper coating of claim 1 as an adhesive.

8. A paper coated with the paper coating composition of claim 7.

9. The styrene-butadiene latex for paper coating of claim 3, wherein
said unsaturated carboxylic acids are selected from the group consisting of methacrylic acid, acrylic acid, itaconic acid, crotonic acid, fumaric acid and maleinic acid, and
said unsaturated polycarboxylic acid alkyl esters having at least one carboxyl group are selected from the group consisting of itaconic acid monoethyl ester, fumaric acid monobutyl ester and maleic acid monobutyl ester.

10. The styrene-butadiene latex for paper coating of claim 5, wherein
said unsaturated carboxylic acid alkyl esters are selected from the group consisting of methylacrylate, methylmethacrylate, ethylacrylate, ethylmethacrylate, butylacrylate and butylmethacrylate,
said unsaturated carboxylic acid hydroxyalkyl esters are selected from the group consisting of β-hydroxyethyl acrylate, β-hydroxypropyl acrylate and β-hydroxyethyl methacrylate,
said unsaturated carboxylic acid amides are selected from the group consisting of acrylamide, methacrylamide, itaconamide and maleic acid monoamide and derivatives thereof, and
said aromatic vinyl monomers are selected from the group consisting of α-methyl styrene, vinyl toluene and p-methyl styrene.

11. A styrene-butadiene latex for paper coating, prepared by reacting the following components:
0.01~10% by weight of sodium methallyl sulfonate,
5~55% by weight of 1,3-butadiene,
40~94% by weight of styrene,
1~15% by weight of ethylene unsaturated acid monomers,
0~10% by weight of vinyl cyanide monomers,
0~30% by weight of other copolymerizable vinyl monomers, and
0.2~10% by weight of molecular weight regulator.

12. The styrene-butadiene latex for paper coating of claim 1, wherein 0.1~5% by weight of said sodium methallyl sulfonate is present.

13. The styrene-butadiene latex for paper coating of claim 11, wherein 0.1~5% by weight of said sodium methallyl sulfonate is reacted.

14. The styrene-butadiene latex for paper coating of claim 1, wherein said latex comprises:
0.01~5% by weight of sodium methallyl sulfonate,
5~55% by weight of 1,3-butadiene,
40~94% by weight of styrene,
2~9% by weight of ethylene unsaturated acid monomers,
3~8% by weight of vinyl cyanide monomers,
3~15% by weight of other copolymerizable vinyl monomers, and
0.2~2% by weight of molecular weight regulator.

15. The styrene-butadiene latex for paper coating of claim 1, wherein said ethylene unsaturated acid monomers are present in an amount of 2~9% by weight.

16. The styrene-butadiene latex for paper coating of claim 1, wherein said vinyl cyanide monomers are present in an amount of 3~8% by weight.

* * * * *